June 19, 1956

P. R. INMAN ET AL 2,750,950

DISH WASHER

Filed June 24, 1955

INVENTOR.
Paul R. Inman
BY Stamatis George Velonis

Atty.

United States Patent Office 2,750,950
Patented June 19, 1956

2,750,950

DISH WASHER

Paul R. Inman, Spokane, and Stamatis George Velonis, Opportunity, Wash.

Application June 24, 1955, Serial No. 517,744

7 Claims. (Cl. 134—102)

The present invention relates to improvements in dish washing machines.

In performing automatic dish washing operations, it is desirable to provide a machine which will operate to clean from the dishes even the dried and sticky food particles in a minimum of time. To do this it is necessary to provide for considerable agitation of hot, soapy water with all parts of the dishes to be washed. In machines which utilize a spray of water to cleanse the dishes, those which are stacked so that their dirty sides are hidden by other articles, or not in the direct line of the spray are not properly cleaned. In those machines wherein the wash water is cascaded over the dishes the same problem arises. One of the most efficient methods of cleansing dishes is to immerse them in a body of water which is subject to consideration agitation. However, it is difficult to produce sufficient agitation of such a body of water without swirling or churning it, and these two methods are not practical since they subject the dishes to violent forces which tend to move them against one another and damage them.

The principal purpose of our invention is to provide a dishwashing machine having a body of water therein, all parts of which are subject to agitation without swirling or churning, caused by bubbles of air passing from the bottom of the body of water to the top.

A further purpose of the invention is to provide a machine wherein the air used to agitate the water may also be used to dry the dishes after the water is drained out.

Still another purpose of the invention is to provide a machine which will receive the dishes as they come from the table with scraps of food, bones, etc., clean the dishes, reduce the scraps to fine particles and discharge them into a sewage system.

The machine is comprised of a housing having a washing tank therein. The tank has a false bottom mounted therein and spaced upwardly a short distance from the bottom wall. The false bottom is provided with a multiplicity of small holes. Both the false bottom and the true bottom have drains therein, and a garbage disposal unit is interposed in the drain leading from the false bottom. An air supply is introduced to the space between the false and true bottoms. When the dirty dishes are placed in the tank, water is sprayed over them. Soap is added and air is introduced to the interspace between the false and true bottoms. The air passes through the holes in the false bottom and bubbles through the water, imparting to it a boiling motion. This motion exists throughout the tank and causes agitation of the water in contact with every surface of each dish. Since the boiling motion creates a random agitation not connected with a general movement of the water, there is no particular force tending to move the dishes against each other.

After the dishes have been cleansed, the water with the food particles, etc., therein, is drained off, the dishes are rinsed, and then the air passing up through the false bottom operates to carry off the moisture from the dishes and dry them. In this manner the air is used both as an agitating agent and as a drying agent.

The nature and advantages of our invention will appear more fully from the following description and the accompanying drawings wherein a preferred form of the invention is shown. It should be understood, however, that the drawings and description are illustrative only and are not intended to limit the invention except insofar as it is limited by the claims.

Figure 1:
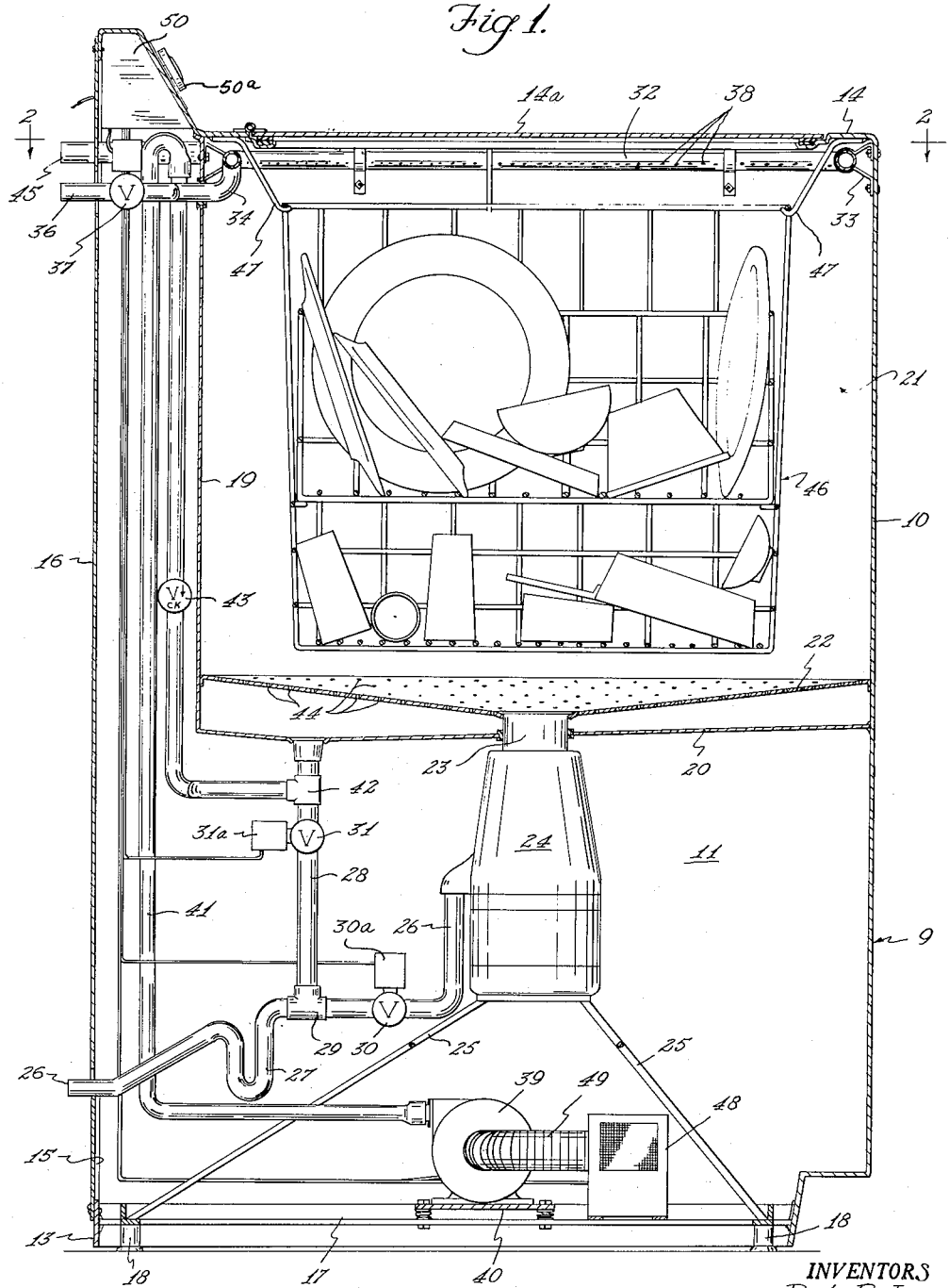
Figure 1 is a vertical sectional view through a dish washing machine embodying our invention.
Figure 2:
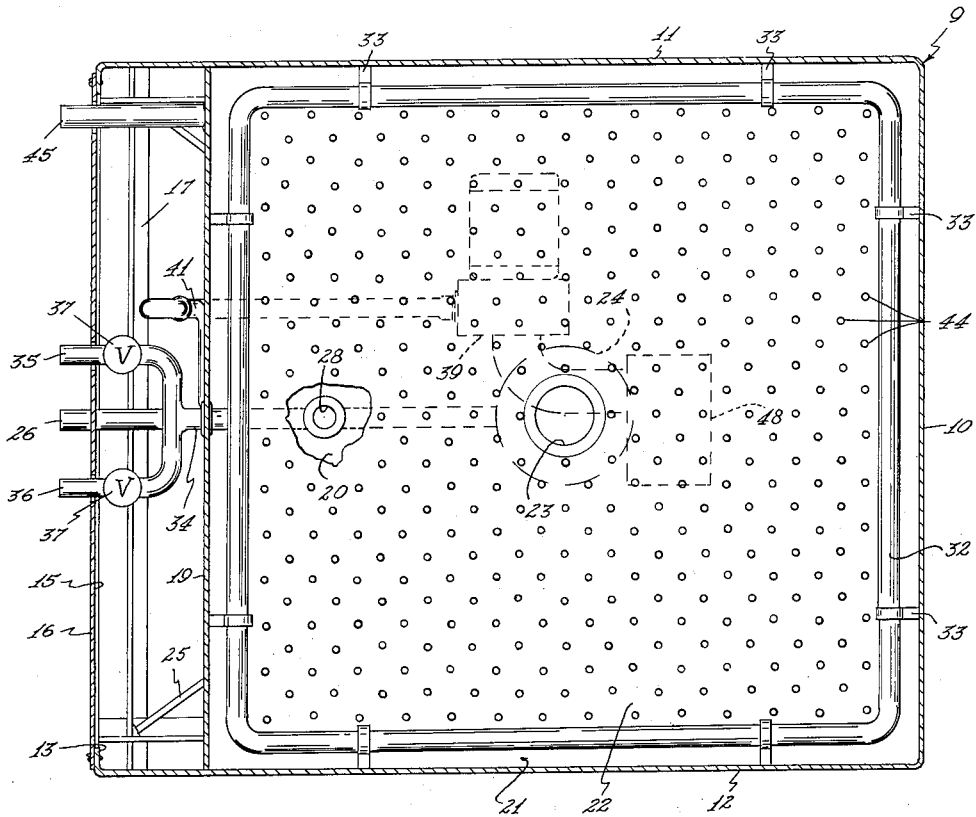
Figure 2 is a plan sectional view of the machine taken substantially on the line 2—2 of Figure 1.
Figure 3:
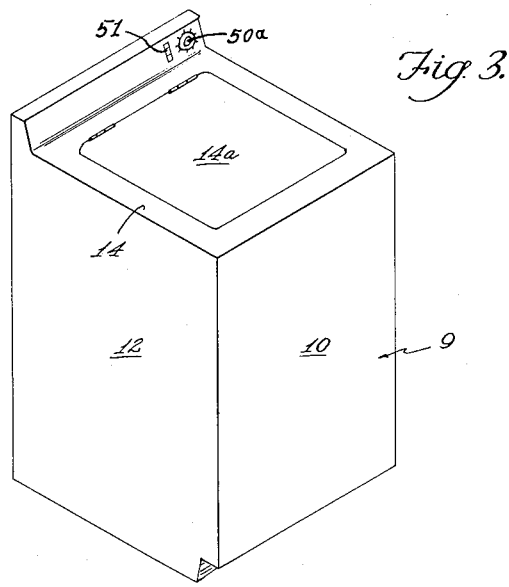
Figure 3 is a reduced perspective view of the exterior of the machine.

Referring now to the drawings, our invention is shown as embodied in a metal housing or body 9 which has a front wall 10, side walls 11 and 12, a rear wall 13 and a top wall 14. The rear wall 13 has a large opening 15 therein by which access may be gained to the interior of the housing 9. The opening 15 is normally covered by a plate 16. At the bottom of the housing 9, a framework 17 is provided. Legs 18 attached to the framework 17 support the housing 9.

Within the housing 9, and spaced forwardly from the rear wall 13 is a vertical partition 19 which extends between the sides 11 and 12. A bottom partition 20 is positioned at the lower edge of the partition 17 and extends to the front wall 10. With this construction a washing tank 21 is formed within the housing 9. Access to the tank 21 is gained through a hinged lid 14a in the top 14. A false bottom 22, shown best in Figure 1, is provided in the tank 21 a short distance above the bottom 20. The vertical spacing between the bottom 20 and false bottom 22 is small, preferably about ½ inch, but is exaggerated in the drawings for the sake of clarity.

At the center of the false bottom 22, a drain pipe 23 is provided. The false bottom slopes slightly inwardly from all sides to the pipe 23. The drain pipe 23 extends down through the bottom partition 20 to a garbage disposal unit 24. The disposal unit 24 may be any one of the well known types which receives waste products, grinds them up, and delivers them to a sewage pipe. The disposal unit 24 is supported by frame members 25 which extend up from the framework 17 at the bottom of the housing 9. At the outlet end of the disposal unit 24 a waste pipe 26 is attached which extends outwardly to the rear of the housing 9. The pipe 26 has a U-shaped trap 27 therein to prevent sewage gases from passing up into the tank 21. The bottom partition 20 also has a drain pipe 28 attached thereto. The pipe 28 extends down to the waste pipe 26 and is coupled thereto by a T fitting 29 secured in the pipe 26.

The waste pipe 26 has a main drain valve 30 therein between the T-fitting 29 and the disposal unit 24. The secondary drain pipe 28 has a secondary drain valve 31 therein. The valves 30 and 31 are operated to open or close the drain pipes by solenoids 30a and 31a.

To fill the tank 21 with water, a spray pipe 32 is secured therein. The spray pipe 32 extends around the four walls of the tank 21 just beneath the top 14. It is secured by brackets 33 fixed on the walls. The spray pipe 32 is attached to a water supply pipe 34 which enters the tank 21 through the rear partition 19. Hot and cold water connections 35 and 36, extending into the housing 9 from the rear are connected to the supply pipe 34. The connections 35 and 36 are each provided with a suitable solenoid operated valve 37. The spray pipe 32 has a multiplicity of small apertures 38 therein directed inwardly and downwardly to spray water into the tank. The apertures 38 are so positioned in the tank as to provide a complete coverage of the tank when the water is turned on. It may readily be seen that the tank 21 will be filled with water when the valves 37 are opened, and the drain valves 30 and 31 closed.

In order to provide agitation, or water motion to the machine, an air pump or blower 39 is provided. As shown in Figure 1, the blower 39 is mounted on a base plate 40 secured to the framework 17 of the housing. An air pipe 41 is connected to the blower 39 and extends to the secondary drain pipe 28. A T coupling 42 connects the air pipe 41 to the pipe 28 just below the bottom partition 20 and above the valve 31. In order to insure that water is not allowed to flow through the air pipe, a check valve 43 is provided therein. The pipe 41 may also be extended upwardly above the waterline of the tank 21 if desired to further prevent water from passing from the tank to the air blower 39. With the construction just described, air may be forced into the space between the bottom 20 and the false bottom 22. A multiplicity of small apertures 44 are formed in the false bottom 22 to pass the air upwardly into the tank 21. These apertures 44 must be small enough to prohibit the passage of food particles into the space between the members 20 and 22, to prevent clogging of the secondary drain pipe 28. As the air from the blower 39 passes through the false bottom 22, it forms bubbles in the water within the tank which rise to the surface. This imparts to the water a motion not unlike that produced by water at a brisk boil. This action is extremely effective in dislodging food particles from articles placed within the tank 21.

To prevent a pressure build up in the tank 21, an air vent 45 is provided at the top which leads to the rear of the housing 9.

A suitable dish holding rack 46 is provided to hold the dishes within the tank 21. The rack may be suspended from brackets attached to the walls as shown at 47.

Now since the air supplied by the blower 39 is that which is present in the room wherein the machine resides, it is desirable to filter it before admission to the tank. It is also desirable to heat the air to maintain an even temperature within the tank as the washing process is carried on. To accomplish this, an air filter and heater unit 48 of any suitable design is supported on the frame 17. A conduit 49 carries air from the filter to the blower intake.

Since it is desirable that the machine operate automatically, the air filter and heater unit 48, the blower 39, the valves 30, 31 and 37, and the disposal unit 24 are all electrically connected to a time sequence control unit generally indicated at 50 in Figure 1. The control unit 50 supplies electric energy to these elements in sequence to perform the operation of the machine. Time control units such as the unit 50 are well known and the particular design of the unit 50 is unimportant, so long as the correct sequence of operation, described later herein, is obtained.

The preferred method of operation will now be described. The operator removes the dish rack 46 from the machine and fills it with the articles to be cleansed. These articles may be loaded into the rack without scraping, and with the food particles, scraps, bones, etc. still upon them.

The rack is placed within the tank 21 and suspended from the brackets 47. The lid 14a is closed. The operator uses the control handle 50a of the control unit 50 to start the machine. In starting the normally open valves 30 and 31 are closed. The blower 39 and the heater 48 are energized, and the water supply valves 37 are opened. The water is sprayed from the pipe 32 until sufficient water to cover the dishes has been supplied. The upward flow of air through the holes 44 in the false bottom 22 keeps the water and fine food particles from passing down through the holes 44 to the bottom 20. A small indicating lamp 51 on the top 14 is lighted, when the amount of water necessary has been introduced into the tank 21, to indicate that soap should be added. The valves 37 are then closed, but the blower 39 and the heater 48 continue to supply heated air through the holes 44 for a short period so that the cleansing of the dishes may be complete. After the lamp 51 is lighted and the valves 37 are closed, the lid 14a may be opened and soap or other cleansing aids may be added. The continuing supply of heated air agitates the water and soap to cleanse the dishes.

The next step in the operation cycle is the opening of the valve 31 and energization of the disposal unit 24. The heated air supply continues through the holes 44 while the tank is drained. Next the valves 37 are opened to supply rinse water and the valve 30 is again closed to build up a sufficient amount of rinse water to thoroughly rinse the dishes by agitating the rinse water with the air that flows up through the holes 44. Then the valve 30 is opened again for final drainage of the rinse water. The blower 39 and the heater 48 continue to operate to dry the dishes. The heated air absorbs the moisture from the dishes and from the interior of the tank and carries it out through the vent 45. Then the control unit stops the blower 39 and deenergizes the heater 48 and cuts off power to the solenoids 30a, 31a and the solenoids of valves 37. The valves 30 and 31 are of a type that open when their solenoids are deenergized so these valves are opened to drain any water left, out of the tank. The valves 37 are of a type that close when their solenoids are deenergized so they remain closed until the cycle of operations is again started.

It should be understood that the operation described may be modified if desired, as for instance, by inclusion of an additional rinsing operation, without departing from the spirit of the invention. The machine may also be used without disposal unit if desired, and operated only to wash dishes that have already been scraped.

It is believed to be clear from the foregoing description that our invention provides an extremely economical, efficient, and sanitary dishwashing machine.

Having thus described our invention, we claim:

1. A dishwashing machine comprising a housing, a washing tank within the housing having side walls, a top wall, and a bottom wall, a perforated false bottom partition secured in the tank and spaced above the bottom wall, said partition having a multiplicity of apertures therein, a drain outlet in the partition, a waste pipe connected to said outlet and extending downwardly through said bottom wall and out of the housing, a secondary drain outlet in the bottom wall, a secondary drain pipe connected to said secondary drain outlet, valve means operable to close the main drain outlet and the secondary drain pipe, an air supply pipe connected to said secondary drain outlet whereby to supply air under pressure between the bottom wall and the partition, means connected to said air supply pipe to supply air under pressure to said pipe, and water supply means to fill the tank with water.

2. A dishwashing machine comprising a housing, a washing tank within the housing having top and bottom and side walls, a perforated false bottom partition in the tank spaced above the bottom wall, said partition having a multiplicity of apertures therein, a main drain pipe connected to the partition and extending downwardly through the bottom wall, said main drain pipe discharging into a waste pipe secured in the housing, a secondary drain pipe connected to the bottom wall and connected to said waste pipe, valve means operable to close the waste pipe and the secondary drain pipe, means to supply air under pressure between the bottom wall and the false bottom partition, and means to supply water to the tank.

3. A dishwashing machine comprising a housing, a washing tank within the housing having top and bottom and side walls, a perforated false bottom partition in the tank spaced above the bottom wall, said partition having a multiplicity of apertures therein, a main drain pipe connected to the partition and extending downwardly through the bottom wall, said main drain pipe discharging into a waste pipe secured in the housing, a secondary drain pipe connected to the bottom wall and connected to said waste pipe, valve means operable to close the waste pipe and the secondary drain pipe, means to supply air under pressure between the bottom wall and the false bottom partition, and means to supply water to the tank, said water supply means comprising a perforated spray pipe extending around the side walls of the tank below the top wall, water supply pipes connected to said spray pipe, and control valves in said water supply pipes.

4. A dishwashing machine comprising a housing, a washing tank within the housing having top and bottom and side walls, a perforated false bottom partition in the tank spaced above the bottom wall, said partition having a multiplicity of apertures therein, a main drain pipe connected to the partition and extending downwardly through the bottom wall, a waste pipe extending out of the housing, said main drain pipe discharging into the waste pipe, a secondary drain pipe connected to the bottom wall and connected to said waste pipe, valve means operable to close the waste pipe and the secondary drain pipe, an air supply pipe connected to said secondary drain pipe between the valve means and the bottom wall whereby to admit air under pressure between the bottom wall and the partition, means to supply air under pressure to said pipe, a check valve in the pipe to prevent passage of water from the tank to the air supply means, and means to supply water to the tank.

5. A dishwashing machine comprising a housing, a washing tank within the housing having top and bottom and side walls, a perforated false bottom partition in the tank spaced above the bottom wall, said partition having a multiplicity of apertures therein, a main drain pipe connected to the partition and extending downwardly through the bottom wall, a waste pipe extending out of the housing, said main drain pipe discharging into the waste pipe, a secondary drain pipe connected to the bottom wall and connected to said waste pipe, valve means operable to close the waste pipe and the secondary drain pipe, an air supply pipe connected to said secondary drain pipe between the valve means and the bottom wall whereby to admit air under pressure between the bottom wall and the partition, means to supply air under pressure to said pipe, a check valve in the pipe to prevent passage of water from the tank to the air supply means, and means to supply water to the tank, said water supply means comprising a perforated spray pipe extending around the side walls of the tank beneath the top wall, water supply pipes connected to said spray pipe, and control valves in said water supply pipes.

6. A dishwashing machine comprising a housing, a washing tank having four side walls and a top wall and a bottom wall, a perforated false bottom partition in the tank and spaced above the bottom wall, said partition having a multiplicity of apertures therein, a main drain outlet in said partition, a main drain pipe connected to said outlet and extending down through the bottom wall, a waste pipe extending out of the housing, said main drain pipe discharging into the waste pipe a secondary drain outlet in the bottom wall of the tank, a secondary drain pipe connected to said secondary drain outlet and connected to said waste pipe, a main drain closing valve in the waste pipe, a secondary drain closing valve in the secondary drain pipe, an air supply pipe connected to said secondary drain pipe between the secondary drain outlet and the secondary drain valve, means to supply heated air under pressure to said air pipe, a check valve in said air pipe to prevent fluid flow from the tank to the air supply means, an air outlet vent at the top of the tank, a spray pipe in the tank extending around the four side walls and secured thereto below the top wall, water supply pipes connected to said spray pipe and extending out of the housing, water supply valves in said water supply pipes, and control means operable to actuate the air supply means, the drain valves and the water supply valves in timed sequence.

7. A dishwashing machine comprising a housing, a washing tank within the housing having top, bottom, and side walls, a perforated false bottom partition within the tank and spaced above the bottom wall, said partition having a multiplicity of apertures therein, a main drain pipe connected to the partition and extending out of the tank, a secondary drain pipe connected to the bottom wall and extending downwardly therefrom, valve means operable to close the main drain pipe and the secondary drain pipe, means to supply air under pressure between the false bottom partition and the bottom wall, and means to supply water to the tank.

References Cited in the file of this patent

UNITED STATES PATENTS

| | | |
|---|---|---|
| 1,208,706 | Hatfield | Dec. 12, 1916 |
| 1,914,309 | Tanner | June 13, 1933 |
| 2,418,366 | Powers | Apr. 1, 1947 |